(12) United States Patent
Rao

(10) Patent No.: US 7,925,247 B2
(45) Date of Patent: *Apr. 12, 2011

(54) MANAGING MOBILE DEVICES BASED ON ROAMING STATUS

(75) Inventor: Bindu Rama Rao, Laguna Niguel, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 627 days.

This patent is subject to a terminal disclaimer.

(21) Appl. No.: 11/799,586

(22) Filed: May 2, 2007

(65) Prior Publication Data

US 2007/0259633 A1    Nov. 8, 2007

Related U.S. Application Data

(60) Provisional application No. 60/797,148, filed on May 2, 2006.

(51) Int. Cl.
*H04M 3/00* (2006.01)

(52) U.S. Cl. .............. 455/418; 455/432.1; 455/432.2; 455/432.3

(58) Field of Classification Search ............ 455/418
See application file for complete search history.

(56) References Cited

U.S. PATENT DOCUMENTS

| | | | |
|---|---|---|---|
| 5,444,765 A * | 8/1995 | Marui et al. | 455/432.1 |
| 5,999,978 A * | 12/1999 | Angal et al. | 709/229 |
| 6,032,044 A * | 2/2000 | Shannon et al. | 455/433 |
| 6,097,966 A * | 8/2000 | Hanley | 455/555 |
| 6,549,770 B1 * | 4/2003 | Marran | 455/419 |
| 7,349,695 B2 * | 3/2008 | Oommen et al. | 455/432.1 |
| 2003/0100303 A1 * | 5/2003 | Armbruster et al. | 455/433 |
| 2003/0103484 A1 * | 6/2003 | Oommen et al. | 370/338 |
| 2005/0010585 A1 * | 1/2005 | Sahinoja et al. | 707/100 |
| 2005/0227683 A1 * | 10/2005 | Draluk et al. | 455/419 |
| 2005/0272455 A1 * | 12/2005 | Oommen | 455/518 |
| 2006/0020947 A1 * | 1/2006 | Hallamaa et al. | 719/317 |

* cited by examiner

*Primary Examiner* — Huy Phan
*Assistant Examiner* — Stamford Hwang

(57) ABSTRACT

A system and electronic device supporting wireless deployment of communication services to a plurality of electronic devices.

20 Claims, 7 Drawing Sheets

205

| Customer Care 207 | Services Management (Voice, Data, Video, MMS, SIP, etc.) 209 | Services Level Tracing (Voice, Data, Video, MMS, SIP, etc.) 211 | |
|---|---|---|---|
| Terminal Management 213 | Service Enablement 215 | Network Design / Operations 217 | Automated Real-time Data Collection Service 219 |
| FUMO 221 | SCOMO 223 | Configuration 225 | DiagMon 227 |
| OMA DM Protocols and OMA DL Protocols 229 | | | |

FIG. 2

MANAGING MOBILE DEVICES BASED ON ROAMING STATUS

The present application makes reference to U.S. Provisional Application Ser. No. 60/797,148 entitled "ENHANCED DEVICE MANAGEMENT FOR A MOBILE DEVICE", filed May 2, 2006, the complete subject matter of which is hereby incorporated herein by reference, in its entirety.

In addition, the present application makes reference to U.S. Provisional Patent Application Ser. No. 60/249,606, entitled "System and Method for Updating and Distributing Information," filed Nov. 17, 2000, and International Patent Application Publication No. WO 02/41147 A1, entitled "System And Method For Updating And Distributing Information", filed Nov. 19, 2001, and having publication date Mar. 23, 2002, the complete subject matter of each of which is hereby incorporated herein by reference, in its entirety.

BACKGROUND OF THE INVENTION

The remote management of electronic devices such as, for example, mobile phones, personal digital assistants (PDA's), pagers, and personal computers may involve the updating of firmware and/or application software, or the configuration of device parameters. The updating of firmware or software components, and the remote provisioning of operating parameters may be a complex activity using communications protocols that are flexible in their capabilities, but that may sometimes be inefficient in terms of the amount of information exchanged for the changes conveyed.

For example, the Open Mobile Alliance (OMA) Device Management (DM) protocol used to manage mobile devices employs extensible markup language (XML)-based messages for session setup, for sending management commands, for receiving status, for exchanging results, etc. Each XML message may contain a number of information items including, for example, a header, a body, security credentials, device information, etc., many of which are often redundant or useless in any given exchange. In some instances, a device management server may be required to send 1 K bytes or more in order to set the value of one byte of data in a device management object in the mobile device. Use of such a "heavyweight" protocol for simple tasks may be costly to a subscriber both in the time needed to perform the device management operations, and in the air time charges incurred.

In many instances, a mobile electronic device may be roaming outside of its home service area, and any device management activities conducted may cause the subscriber to incur roaming charges. A subscriber is not likely to be happy to receive a hefty bill for a 1 MB firmware update conducted while the user is roaming. At the present time, it is normally not possible to determine whether a mobile device is roaming, and most mobile devices when engaging in device management activities do not inform the device management server when they are roaming. Thus, a device management server may unknowingly initiate device management activities when the mobile device is roaming, or select an inappropriate device management protocol, causing subscribers to incur air time charges at higher roaming rates for device management activities that could just as easily be performed at a later time, when the mobile device is within its home service area, or with a more efficient protocol.

Further limitations and disadvantages of conventional and traditional approaches will become apparent to one of skill in the art, through comparison of such systems with the present invention as set forth in the remainder of the present application with reference to the drawings.

BRIEF DESCRIPTION OF SEVERAL VIEWS OF THE DRAWINGS

FIG. 2 is a perspective block diagram of an exemplary set of functional subsystems that may be employed in a mobile network corresponding to, for example, the network of FIG. 1, that support services management and service level tracing, wherein mobile devices are managed using device management protocols, in accordance with a representative embodiment of the present invention.

DETAILED DESCRIPTION OF THE INVENTION

Figure 1:
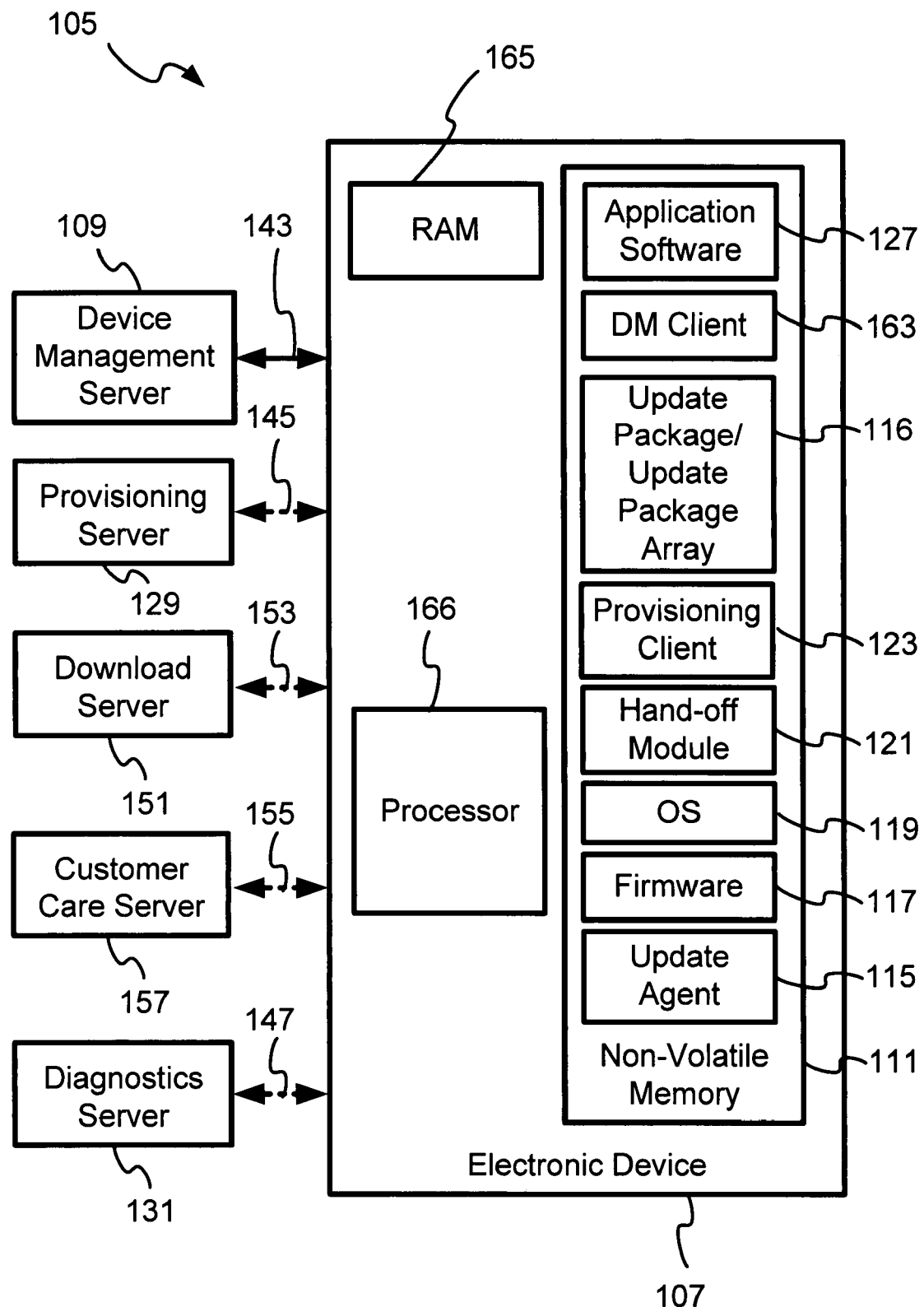
FIG. 1 is a perspective block diagram of an exemplary network that supports remote access to and/or update of device parameters, firmware and/or software in memory of an electronic device such as, for example, a mobile handset or personal digital assistant, in accordance with a representative embodiment of the present invention.

Aspects of the present invention may be found in a method, a system, and/or a device that supports remote updating of memory, and the determination and configuration of device management and operational parameters in mobile electronic devices. More specifically, aspects of the present invention may be found in a method, system and device supporting the exchange of device capability and operating information that helps to minimize cost and subscriber impact of remote device management activities for roaming mobile/handheld electronic devices such as, for example, a mobile handset, a cellular phone, a personal digital assistant, a pager, a personal computer, or any of a number of other portable or handheld electronic devices with communication functionality. Suitable device capability/operating information may, for example, make accessible indications of the operational status of an electronic device, to enable a device management server to determine when updating of device software/firmware and device management parameters is least costly and/or least likely to have negative subscriber impact. In addition, the exchange of such device management information may employ "lighter", lower overhead protocols that permit more efficient monitoring and configuration of such electronic devices. Although much of the following discussion relates to a mobile handset or mobile device such as a cellular phone, personal digital assistant (PDA), pager, or personal computer (PC), the teachings of the present invention also apply to any of a wide variety of electronic devices with wired or wireless communication functionality that provide subscriber access to communication services such as, for example, those named above, and other electronic devices having similar characteristics.

Representative embodiments of the present invention may be employed during updates using wired or wireless communication links such as, for example, a public switched telephone network, a wired local or wide area network, an intranet, the Internet, and wireless cellular, paging, local area, personal area, and short range networks such as those referred to as WiFi, IEEE 802.11 a/b/g/n compatible networks, the short range wireless technology known as Bluetooth, and similar types of communication links. Representative embodiments of the present invention may also be employed in converged devices supporting two or more of the types of communication links listed above.

In a representative embodiment of the present invention, information for updating memory in an electronic device such as those described above may be communicated using, for example, an update package comprising a set of instructions executable by firmware and/or software in the electronic device to transform or convert an existing version of software, firmware, and/or data in the electronic device into a new or updated version of the software, firmware, and/or data. Access and provisioning of device management information may be performed using existing standards-based device management protocols, or proprietary protocols.

FIG. 1 is a perspective block diagram of an exemplary network 105 that supports remote access to and/or update of device parameters, firmware and/or software in memory of an electronic device 107 such as, for example, a mobile handset or personal digital assistant, in accordance with a representative embodiment of the present invention. The electronic device 107 may, for example, comprise a cellular phone, a personal digital assistant (PDA), a pager, a handheld personal computer (PC), and/or the like. The electronic device 107 may support a number of features and/or applications that may contain software/firmware errors that need to be corrected, or the electronic device 107 may provide additional features/benefits by updating/adding to the software/firmware. Device capability information and/or operational/configuration parameters in the electronic device 107 may be remotely accessed and/or modified as part of management of the electronic device 107. The electronic device 107 may itself be used to request updates to software/firmware via a customer care server 157 either directly, using a browser in the electronic device 107, or via a customer service representative (CSR). A CSR may, for example, provide service to the customer using the electronic device 107 by retrieving, as necessary, one or more diagnostic management objects (MOs) stored in memory of the electronic device 107, and by transmitting to the electronic device 107 from a remote server, update information in the form of, for example, one or more update packages. Such update packages may, for example, comprise instructions to code in the electronic device 107 to convert or transform a first version of software/firmware to a second version of software/firmware, in the electronic device 107, in addition to metadata, and checksum information.

As shown in the illustration of FIG. 1, the network 105 in a representative embodiment of the present invention may comprise the electronic device 107, a device management (DM) server 109, a provisioning server 129, a customer care server 157, a download server 151, and a diagnostics server 131. Although not illustrated in FIG. 1, a representative embodiment of the present invention may also comprise other application servers such as, for example, a diagnostics server, and a self-care website/portal. The electronic device 107 of FIG. 1 is able to communicate with the DM server 109, the download server 151, the customer care server 157, the provisioning server 129, and the diagnostics server 131 via communication paths 143, 153, 155, 145, and 147 respectively. Although the communication paths 143, 153, 155, 145, 147 are illustrated as being separate paths between the electronic device 107 and their respective servers, this is only for purpose of illustration, and is not a specific limitation of a representative embodiment of the present invention. The communication paths 143, 153, 155, 145, 147 may be combined into one or more paths that may comprise wired or wireless communication paths such as, for example, a local area network, a public switched telephone network, a wireless personal, local or wide area network, and a cellular or paging network, to name only a few possibilities.

As illustrated in FIG. 1, an electronic device in accordance with a representative embodiment of the present invention may comprise a processor 166, random access memory (RAM) 165, and non-volatile memory (NVM) 111. The NVM 111 may comprise, for example, NAND or NOR type flash memory or other suitable type of NVM. The NVM 111 may contain a number of software/firmware code components of the electronic device 107 including, for example, application software 127, a device management (DM) client 163, an update package/update package array 116, a provisioning client 123, a hand-off module 121, an operating system (OS) 119, firmware 117, and one or more update agent(s) 115. Additional software/firmware code components may also be present in the RAM 165 and NVM 111. The term "code" may be used herein to represent one or more of executable instructions, operand data, configuration parameters, and other information stored in memory of the electronic device 107, and the term "update package catalog" may be used interchangeably with the term "update package array" to refer to received update information that comprises multiple update packages.

In a representative embodiment of the present invention, an electronic device such as, for example, the electronic device 107 of FIG. 1 may employ an update package (e.g., the update package/update package array 116) delivered by a remote server such as, for example, the download server 151, to update firmware/software, data and configuration information in memory of the electronic device 107. Such an update package may comprise update information including, for example, metadata describing an update, checksums, and instructions executable by one or more update agents such as, for example, the update agent 115 of FIG. 1. The update agent 115 may process a set of executable instructions, which may be used as a compact means to encode differences between existing/first and updated/second versions of firmware, software, data, and configuration parameters for the electronic device 107. The executable instructions may be assembled into update packages to be transmitted to an electronic device for use in updating memory of the electronic device. Update agent(s) in the electronic device may process respective portions of the executable instructions from an update package to convert/transform corresponding portions of an existing/first version of code in memory of the electronic device 107 to portions of an updated/second version of code. The electronic device 107 may also receive provisioning information from, for example, the device management server 109, the customer care server 157, and/or the provisioning server 129 to fix configuration problems or reconfigure software and hardware.

In addition to those elements described above, the electronic device 107 may comprise a downloaded diagnostic client (not shown) that facilitates remote diagnosis, and a traps client (not shown) that facilitates the setting of traps and retrieving of collected information. The DM client 163 of the electronic device 107 may interact with the DM server 109, the diagnostic client, and the traps client, to receive DM commands from the DM server 109 and to implement them in the electronic device 107. The download server 151 may be employed to download firmware and software updates (e.g., update information in the form of, for example, update packages). The download server 151 may also be used to download new firmware/software such as, for example, the diagnostics client mentioned above, which may then be installed and activated in the electronic device 107.

As described briefly above, an electronic device in accordance with a representative embodiment of the present invention (e.g., electronic device 107) may receive update information (e.g., an update package) for processing by one or more update agents (e.g., update agent 115) to convert/transform software (e.g., application software 127) and/or firmware (e.g., firmware 117) to produce updated software/firmware in the electronic device. In some representative embodiments of the present invention, the update agent 115 may comprise multiple update agents, each of the update agents appropriately arranged to process different types of update information for updating different types/formats of software, firmware, user data, and configuration parameters in the memory of the electronic device 107. Each of the update packages received may be processed in the electronic device by an appropriate one of the update agent(s) 115 to update an associated type of information in the memory of the electronic device 107.

FIG. 2 is a perspective block diagram of an exemplary set of functional subsystems 205 that may be employed in a mobile network corresponding to, for example, the network 105 of FIG. 1, that supports services management and service level tracing, in accordance with a representative embodiment of the present invention. In a representative embodiment of the present invention, mobile devices may be managed using a standards-based device management protocol. In an exemplary embodiment, the functional subsystems 205 may include customer care 207, services management 209, services level tracing 211, terminal management 213, service enablement 215, network design/operations 217, automated real-time data collection service 219, FUMO 221, SCOMO 223, configuration 225, DiagMon 227, and OMA DM Protocols and OMA DL Protocols 229. The functional subsystems 205 enable determination of device capability information from a mobile device such as, for example, the electronic device 107 of FIG. 1, wherein the mobile device supports several features and services, and is also enabled to perform firmware/software downloads and installation. In a representative embodiment of the present invention, each of the illustrated subsystems may have corresponding functional elements in both the network (e.g., the network 105) and the mobile device (e.g., the electronic device 107), which operate in a coordinated fashion to perform the indicated function. The mobile device (e.g. electronic device 107) may request customer care services from a customer care server such as, for example, the customer care server 157 of FIG. 1, and may include device capability information as one of the parameters provided to the customer care server 157. A customer service representative (CSR) (not shown) may provide customer care service to the customer/subscriber using the mobile device (e.g. electronic device 107), and may also activate service enablement 215 operations as requested by the customer/subscriber. In a representative embodiment of the present invention, the service enablement subsystem 215 may determine what firmware/software/provisioning parameters/data are needed at a server in the network, and in the mobile device, to support delivery of a new service to the mobile device. The service enablement subsystem 215 may employ the SCOMO subsystem 223 and the configuration subsystem 227, for example, to cause servers involved in service delivery, and the mobile device, to be enabled (e.g., have the appropriate firmware/software, provisioning parameters, account information, permissions, network identifiers, etc.) for service delivery.

In a representative embodiment of the present invention, network operations servers of a network operations subsystem 217 may monitor the state of deployment of a service, and an automated real-time data collection subsystem 219 may automatically collect real-time data, following deployment of a new service in a network such as, for example, the network 105 of FIG. 1. In addition, the network operations subsystem 217 may be instructed by a service level tracing subsystem 211 to conduct service level tracing for each deployed service, especially when such services are newly or initially deployed.

Examples of management operations that may be conducted by the network 105 upon mobile devices such as the electronic device 107 of FIG. 1 using the functional subsystems 205 include configuration of mobile devices, conducting firmware/software updates upon mobile devices, initiating firmware/software downloads onto mobile devices, and the diagnosing of problems with the mobile devices, to name only a few.

The functional subsystems 205 of the network 105 also support the sending of provisioning information from a customer care server such as the customer care server 157 of FIG. 1, or from a configuration/provisioning server such as the provisioning server 129 of FIG. 1, to a mobile device to fix configuration problems and/or to reconfigure firmware, software and/or hardware in the mobile device (e.g., electronic device 107 of FIG. 1). In a representative embodiment of the present invention, a mobile device in a network such as, for example, the electronic device 107 of network 105 of FIG. 1 may apply one more updates to firmware, software and/or configuration information/parameters using one or more update agents resident in the mobile device, such as the update agent 115 of FIG. 1, for example.

A representative embodiment of the present invention supports a device management (DM) approach in which management objects (MOs) may be created and used for each feature domain or application. Each MO may comprise device capability information for the associated feature or application. In a representative embodiment of the present invention, each feature/application installed in the mobile device may provide device capability information, that may be stored as a MO (e.g., a set of sub-nodes) of a standard management object of a standards-based device management tree such as, for example, as sub-nodes of the "DevDetail" MO in an Open Mobile Alliance (OMA) Device Management (DM) compatible DM tree in the mobile device (e.g. electronic device 107). The OMA DM protocol has been developed under the direction of the Open Mobile Alliance, Ltd. The device capability information may be retrieved by a DM server such as, for example, the DM server 109 of FIG. 1, or a customer care server such as, for example, the customer care server 157 of FIG. 1, in the form of XML-formatted data, or as an OMA "UAProf"-based device profile, to name two possible mechanisms.

Figure 3:
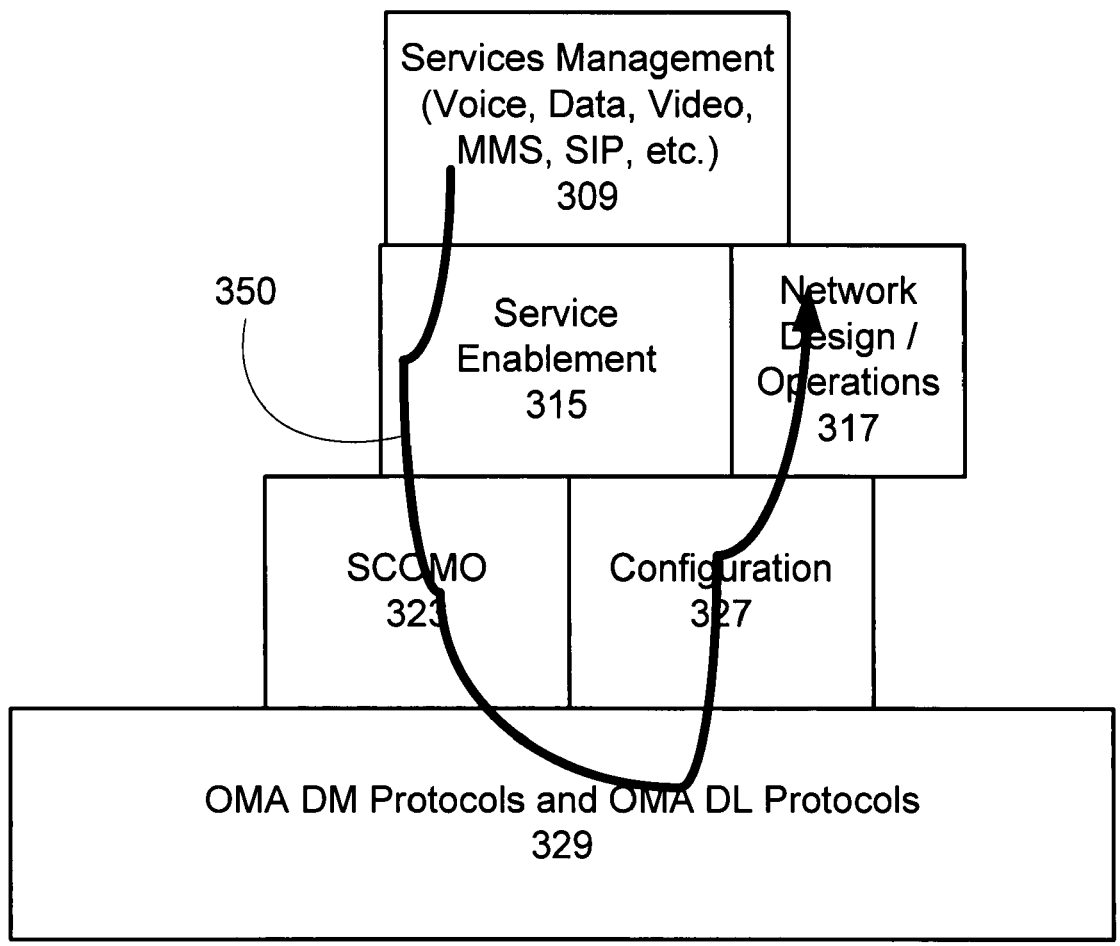
FIG. 3 is a perspective block diagram of an exemplary subset of functional subsystems that may correspond by name to those shown in FIG. 2, and that may be used to support services management and service level tracing, in which different functional subsystems cooperate in the process of designing, planning and deploying a service, in accordance with a representative embodiment of the present invention.

FIG. 3 is a perspective block diagram of an exemplary subset of functional subsystems 305 that may correspond by name to those shown in FIG. 2, and that may be used to support services management and service level tracing, in which different functional subsystems cooperate in the process of designing, planning and deploying a service, in accordance with a representative embodiment of the present invention. As shown in FIG. 3, an exemplary loop of activities involved in service design, planning and deployment, a service management subsystem 309 interacts with a service enablement subsystem 315 to initiate service deployment. In turn, the service enablement subsystem 315 may employ the services of a software component management (SCOMO) subsystem 323 and a configuration subsystem 327 to facilitate software component delivery, installation, and configuration, in addition to establishment of accounts on the mobile device (e.g., electronic device 107), and on a server (e.g., DM server 109, provisioning server 129, or customer care server 157). The SCOMO subsystem 323 and configuration management subsystem 327 may also interact with an OMA-DM protocol subsystem 329, which may provide OMA download (DL) protocol support for firmware/software downloads.

In a representative embodiment of the present invention, the service management subsystem 309 may interact with network design/network operations subsystem 317 to make it possible to design interactions between network elements for deploying the service(s). The service management subsystem 309 may also set up service monitoring activities that are conducted by the network operations subsystem 317, after a service has been deployed. Service monitoring, facilitated by the network operations subsystem 317, makes it possible to determine details about the user experience with a service, key performance indicators, and impact on network throughput, to name a few possible applications.

In this way, service enablement may drive user experience, and network operations may drive service monitoring, for a typical service deployment. By employing a representative embodiment of the present invention, new services such as new voice services, new data services, new methods of video delivery, multimedia messaging service (MMS), session initiation protocol (SIP)-based voice and data services, for example, may be designed, deployed, monitored and managed in a mobile network such as, for example, the network 105 of FIG. 1.

Figure 4:
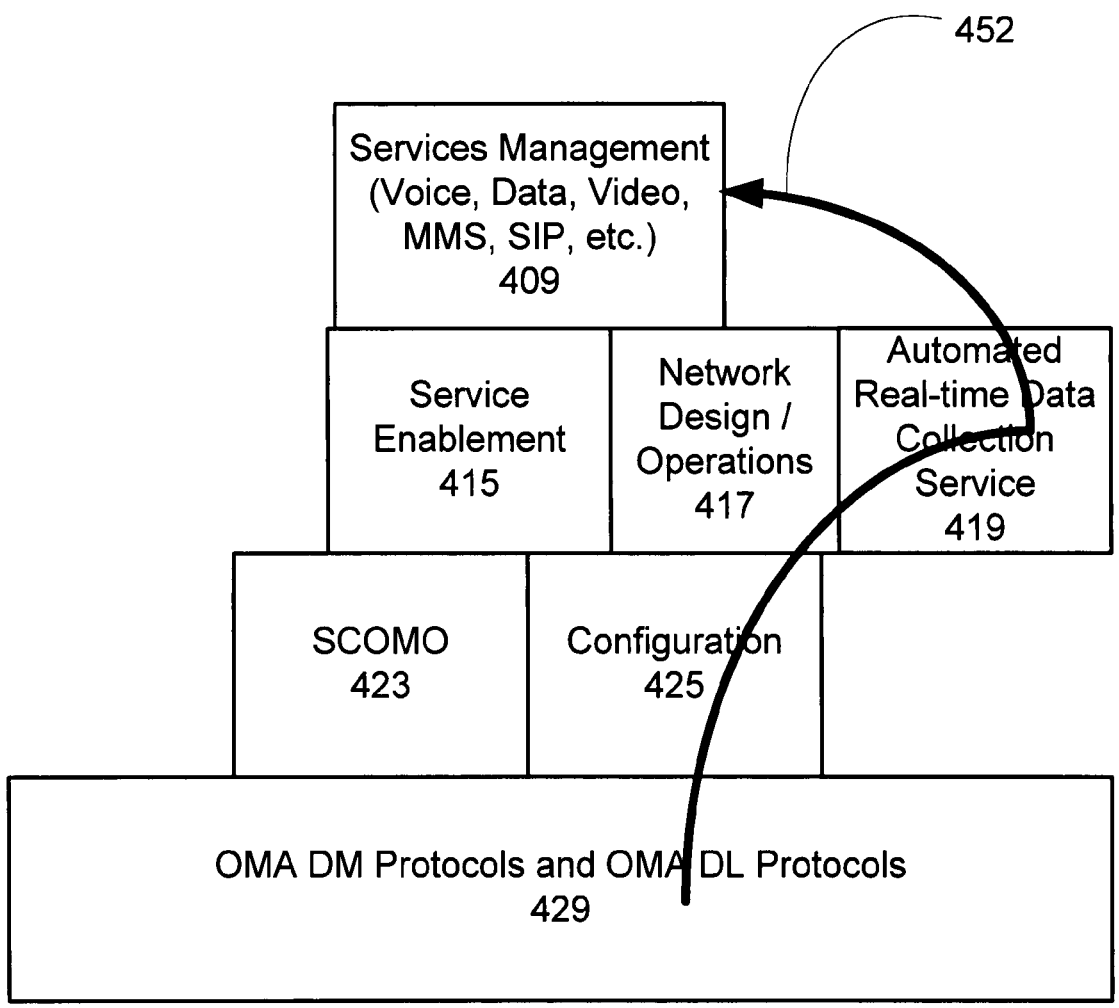
FIG. 4 is a perspective block diagram of an exemplary subset of functional subsystems that may correspond by name to those shown in FIG. 2, and that may be employed to support automated data collection from newly configured electronic devices to monitor a newly deployed service, in accordance with a representative embodiment of the present invention.

FIG. 4 is a perspective block diagram of an exemplary subset of functional subsystems 405 that may correspond by name to those shown in FIG. 2, and that may be employed to support automated data collection from newly configured electronic devices to enable monitoring of a newly deployed service, in accordance with a representative embodiment of the present invention. In an exemplary embodiment, functional subsystems 405 may include services management 409, service enablement 415, network design/operations 417, automated real-time data collection service 419, SCOMO 423, configuration 425, and OMA DM Protocols and OMA DL Protocols 429. As shown in FIG. 4, a server such as, for example, a diagnostics server (e.g., the diagnostics server 131 of FIG. 1) or an automated data collection server (not shown) may receive data collected from within one or more mobile devices (e.g., electronic device 107) that have been provisioned/subscribed to access new services being deployed. The newly subscribed mobile devices may employ an automated data collection subsystem to collect data about the installation, operation, and usage of the newly deployed service, and may reporting the collected data back to, for example, the diagnostics server 131 of FIG. 1, or another server for automated data collection (not shown). The automated collection of data may be enabled or disabled by, for example, the service enablement subsystem 415, when the service is first provisioned into a mobile device (e.g., electronic device 107). Such service provisioning may occur, for example, after a firmware/software download and installation (or, for example, upgrade) associated with the service is completed. Automated data collection from a mobile device such as the electronic device 107 of FIG. 1 may also be turned on by a customer care system such as, for example, the customer care server 157 of FIG. 1, in response to a customer care request or a complaint received by a customer-care representative.

FIG. 4 also illustrates a feedback loop 452 for automatically collecting data that is created during the deployment and use of a new service in the mobile devices of a network such as the network 105 of FIG. 1. Feedback of such deployment-related data makes it possible to, for example, collect data on the efficiency of a deployed solution (e.g., for a service) and collect usage statistics (e.g., to track compute resources consumed, etc.) on consumption of deployed services, to name must two examples. A representative embodiment of the present invention enables a service provider to collect real-time data regarding the consumption of the services deployed on the mobile devices in a network such as the network 105 of FIG. 1.

Figure 5:
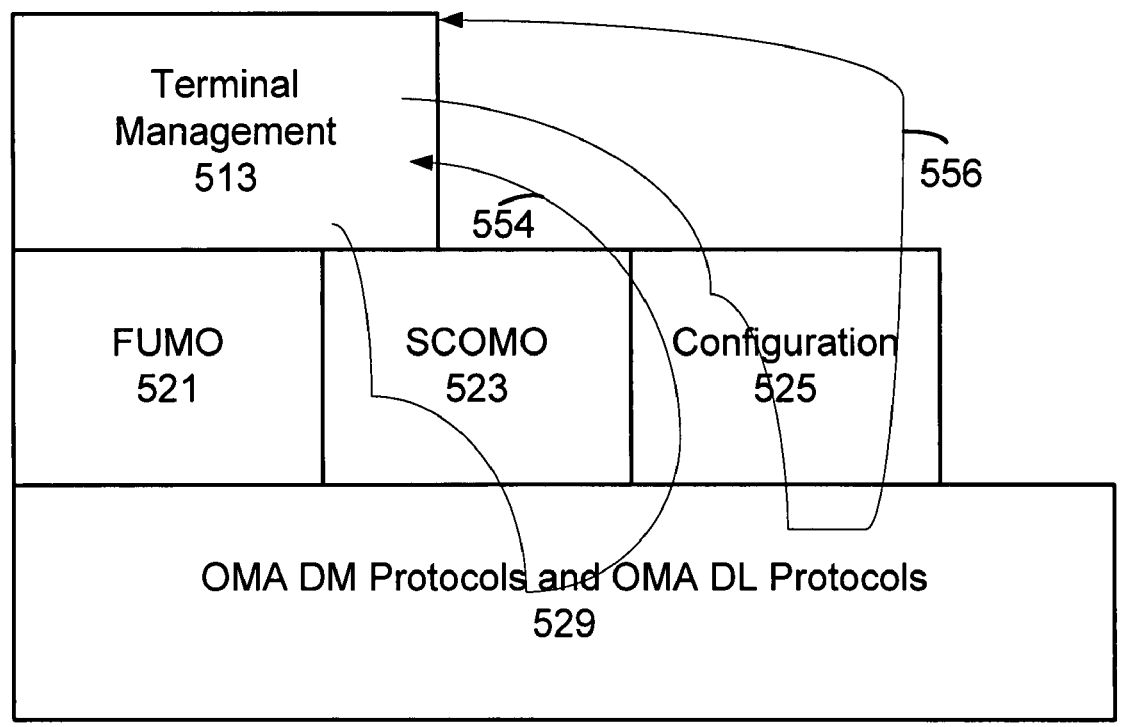
FIG. 5 is a perspective block diagram of an exemplary subset of functional subsystems that may correspond by name to those shown in FIG. 2, and that may be employed to provide terminal management services with the help of a terminal management system, in accordance with a representative embodiment of the present invention.

FIG. 5 is a perspective block diagram of an exemplary subset of functional subsystems 505 that may correspond by name to those shown in FIG. 2, and that may be employed to provide terminal management services with the help of a terminal management system, in accordance with a representative embodiment of the present invention. In an exemplary embodiment, the functional subsystems 505 may include terminal management 513, FUMO 521, SCOMO 523, configuration 525, and OMA DM Protocols and OMA DL Protocols 529. Terminal management of a mobile device may involve one or more services such as, for example, firmware/software installation, device/service configuration/reconfiguration, virus scan services, device lock, device backup, device restore, and device wipe, to name just a few services. The systems/servers of a network (e.g., the network 105 of FIG. 1) that may be involved in providing terminal management services may include a terminal management server, a FUMO (firmware update) server, a SCOMO server, a configuration server and an OMA-DM protocol server (which may also support or provide OMA download protocols). In a representative embodiment of the present invention, these server functionalities may be provided by any combination of the DM server 109, the provisioning server 129, the download server 151, the customer care server 157 and the diagnostics server 131 shown in the illustration of FIG. 1.

As illustrated in FIG. 5, an exemplary terminal management activity 554 in accordance with a representative embodiment of the present invention may comprise interactions between a terminal management subsystem 513 and a software component management (SCOMO) subsystem 523, to install a standard set of firmware/software components in a mobile device (e.g., the electronic device 107). Such software component installation may comprise installation of, for example, virus scanning firmware/software, virus scan definition data, email client firmware/software, device configuration firmware/software, and backup firmware/software, to name just a few possible firmware/software components. After the installation of the firmware/software components is complete, an additional terminal management activity 556 may be conducted to set up both server-side (i.e., at the network 105) and client-side (i.e., on the electronic device 107) accounts for the installed firmware/software components (and the associated applications). This terminal management activity 556 may comprise, for example, configuring information for various subscriber accounts such as, for example, email accounts, security parameters such as secure sockets layer (SSL) certificates, and other types of account parameters.

Figure 6:
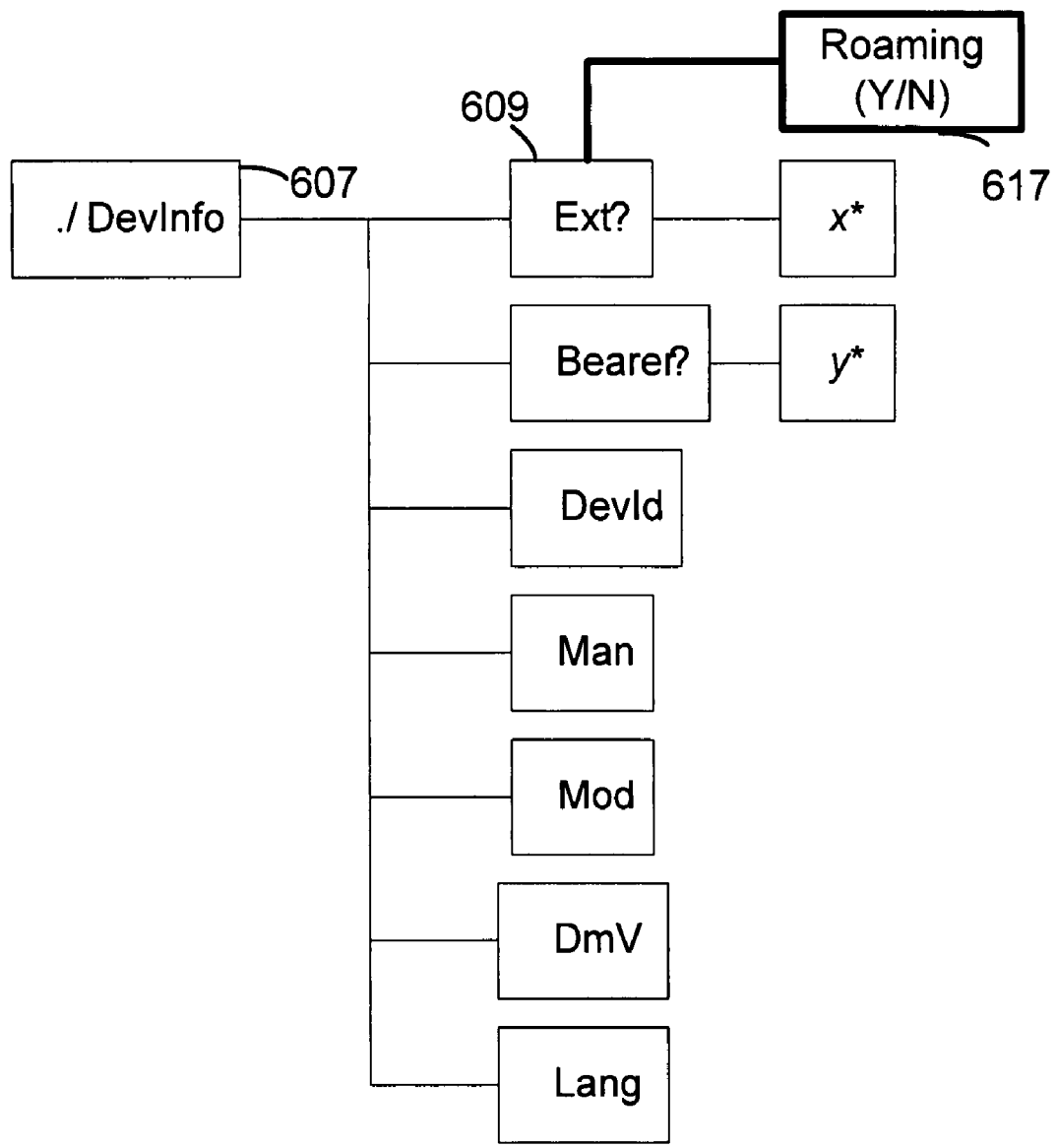
FIG. 6 illustrates the structure of an exemplary management object that may reside in a device management tree in memory of a mobile device such as, for example, the electronic device of FIG. 1, in accordance with a representative embodiment of the present invention.

FIG. 6 illustrates the structure of an exemplary management object 617 that may reside in a device management tree in memory of a mobile device such as, for example, the electronic device 107 of FIG. 1, in accordance with a representative embodiment of the present invention. The management object 617 shown in FIG. 6 supports remote and local access to roaming status information as a roaming indicator node extension of a standards-based management object in a mobile device such as the electronic device 107 of FIG. 1. As illustrated in the exemplary arrangement of FIG. 6, a management object of a standard such as the OMA DM protocol may be enhanced by the definition of a sub-node that provides information on the operational status of the mobile device. In the example of FIG. 6, a "Roaming" management object/sub-node 617 has been created as an element/sub-node of the OMA DM standard "./DevInfo" management object 607, so that a remote device management server such as, for example, the DM server 109 of FIG. 1, may detect whether the mobile device is currently roaming (i.e., outside of its home service area). The OMA DM standard "./DevInfo" management object 607 represents device information that is similar to that of the "./DevInfo". management object described in the OMA DM standard developed by the Open Mobile Alliance, Ltd.

A representative embodiment of the present invention enhances the "./DevInfo" management object specified by, for example, the OMA DM 1.2 standard, by providing a node in the management tree in which the roaming status of a mobile device (e.g., the electronic device 107) is made available/displayed. For example, a roaming node in accordance with a representative embodiment of the present invention may be provided under the optional OMA DM vendor extension node "Ext", making it possible to show to a DM server (e.g., the DM server 109) whether the mobile device is roaming. In a representative embodiment of the present invention, client firmware/software in the mobile device (e.g., the electronic device 107) such as, for example, the DM client 163 of FIG. 1 (or, for example, some other client firmware/software in the mobile device), may be responsible for setting the value of the roaming node (e.g., the "Roaming" management object/sub-node 617 shown in FIG. 6) appropriately during operation. In one representative embodiment of the present invention, the value of the roaming node may, for example, be set to "Y" or "N", with "./DevInfo/Ext/Roaming" set to "Y" to indicate that the mobile device is currently roaming, and to "N" to indicate that the mobile device is currently being served in its home service area. In another representative embodiment of the present invention, the value of the roaming node may be set to 1 or 0, with roaming set to 1 to indicate that the mobile device is currently roaming, and to 0 to indicate that it is currently being served in its home service area. Other values for such a roaming indicator node are possible and contemplated.

In one representative embodiment of the present invention, a "./DevInfo" management object, in which the basic structure has been defined by the OMA DM protocol standard and which is enhanced in accordance with the present invention by the addition of the roaming indicator node, may be sent from the mobile device to a device management server (e.g., the DM server 109 of FIG. 1) at the beginning of each device management session. In this way, the device management server may determine whether the mobile device is roaming, based on the value of the roaming indicator node, "./DevInfo/Ext/Roaming", for example. If the DM server (e.g., the DM server 109) determines that the mobile device is roaming, the DM server may elect to not conduct a particular device management operation. This permits the device management server to avoid imposing the potentially high cost of roaming charges incurred during any device management activities.

In another representative embodiment of the present invention, the DM server may determine that the mobile device is roaming, and may conduct only simple management operations such, for example, as setting parameter values or changing configurations. The device management server (e.g., DM server 109) may choose not to conduct complicated and/or data intensive management operations such as firmware updates and software updates, thus avoiding the possibly high air time charges typically imposed by wireless service providers upon subscribers that roam into their service areas.

In yet another representative embodiment, the DM server may request the user's approval or permission before conducting device management operations when the mobile device is in a roaming situation.

As described above, the value of a roaming indicator node in accordance with a representative embodiment of the present invention (which is like a flag) may be set by a DM client, or by another client in the mobile device, and may be conveyed to a DM server in the serving network, at the start of or during each session. The DM client may determine (e.g., from other applications in the mobile device, for example) whether the mobile device is roaming, and may set the value of a roaming indicator management object/sub-node in a device management tree, accordingly. When needed, this MO value may be retrieved by the DM server by issuing, for example, an OMA DM "Get" operation on the "./DevInfo/Ext/Roaming" management object/sub-node.

Although the location of the roaming indicator management object/sub-node is described above with reference to the OMA DM "DevInfo" MO, other MOs may be used instead (or as the site of additional roaming indicators) under which to create such an extension of the device management protocol, for the same or similar purpose.

It will be apparent to one of ordinary skill in the art upon reading and understanding this disclosure, that other operational parameters and data in electronic devices may also be made remotely accessible using the innovative technique described herein.

Figure 7:
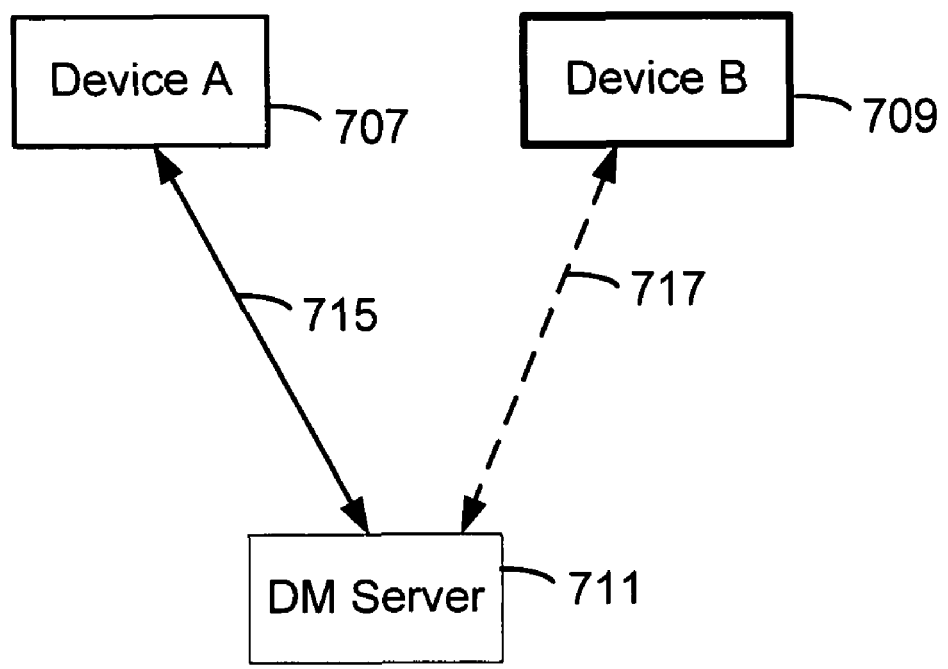
FIG. 7 is a perspective block diagram of an exemplary network for managing electronic devices in which a device management server uses both an OMA-DM-compliant protocol as well as a proprietary or light-weight protocol to manage mobile devices, in accordance with a representative embodiment of the present invention.

FIG. 7 is a perspective block diagram of an exemplary network 705 for managing electronic devices in which a device management server 711 uses both an OMA-DM-compliant protocol 715 as well as a proprietary or light-weight protocol 717 to manage mobile devices 707, 709, in accordance with a representative embodiment of the present invention. The terms "heavy-weight" and "light-weight" are used herein to refer, respectively, to those protocols that are higher-overhead or less efficient for a given task, versus those that are lower overhead or more efficient for the same task. In a representative embodiment of the present invention, all mobile devices 707, 709, whether managed using OMA-DM-compliant protocols or other alternative management protocols, may employ the same or a similar set of management objects and result codes. In the illustration of FIG. 7, the DM server 711 employs the OMA-DM-compliant protocol 715 (e.g., the OMA DM 1.2 protocol), which happens to be a "heavy-weight" protocol based on XML, to interact with and manipulate management objects in the device A 707. The DM server 711 of FIG. 7 also employs an alternate device management protocol 717 (e.g., a proprietary protocols, or standard protocol such as the hypertext transport protocol "http"), which happens to be a "light-weight" protocol and not necessarily based on XML, to interact with and manipulate management objects in the device B 709.

In a representative embodiment of the present invention, the same or a similar set of standard management objects such as, for example, those defined as firmware management objects (FUMO), software component management objects (SCOMO), the "./DevInfo" management object, and the "./DevDetail" management object may be supported by both of the mobile devices 707, 709. However, in accordance with a representative embodiment of the present invention, the means to remotely manipulate them may be different with a different transport mechanism for management actions being employed, as in the example of FIG. 7, in which the OMA DM protocol 715 is employed for device management of mobile device A 707 and an alternative protocol is employed for device management for mobile device B 709. In a representative embodiment of the present invention, the results codes and additional state information provided by the mobile devices 707, 709 to the DM server 711 may be the same for the same conditions, as those defined by, for example, the OMA DM and/or other device management protocol standards.

In a representative embodiment of the present invention, the service enablement and service management aspects of both of the mobile devices 707 and 709 may be similar, in spite of the fact that the actual device management protocols employed by the DM server 711 are different but appropriate for different mobile devices. Thus, as long as a mobile device supports management objects as defined by a device management protocol standard, the management objects may be managed by a DM server in accordance with a representative embodiment of the present invention, regardless of the DM protocols used as a transport layer to interact with the mobile device.

Aspects of the present invention may be found in a handheld electronic device comprising at least one non-volatile memory having stored therein one or both of firmware and software; and at least one processor operably coupled to the non-volatile memory. The at least one processor may, during operation, at least store operating status information of the handheld electronic device as a sub-node of a standards-defined device management object in a device management tree in the non-volatile memory, and may wirelessly receive, from at least one remote server via a communication network, a request for the operating status information, the request communicated according to a device management protocol standard. The at least one processor may also wirelessly transmit the requested operating status information to the at least one remote server. In a representative embodiment of the present invention, the handheld electronic device may comprise one of a mobile handset, a cellular phone, and a converged device supporting both a cellular network and a wireless local area network commonly referred to as a WiFi network. The operating status information may be expressed as extensible markup language (XML) when transmitted. The operating status information may be stored as a sub-node or part of a device management object defined in the Open Mobile Alliance (OMA) Device Management (DM) Version 1.2 or earlier protocol specification, and the operating status information may be representative of roaming status of the handheld electronic device. The non-volatile memory may comprise flash type memory, and the communication network may comprise a public communication network.

Further aspects of the present invention may be seen in a system for managing service deployment in a plurality of handheld electronic devices. Such a system may comprise at least one server. The at least one server may comprise at least one interface enabling communication with the plurality of handheld electronic devices via a wireless communication network, and at least one processor operably coupled to the at least one interface and at least one memory. The at least one processor may function during operation to, among other things, receive operating status information for one of the plurality of handheld electronic devices via the wireless communication network in accordance with a device management protocol standard, and determine whether an operating condition for the one of the plurality of handheld electronic devices is met; based upon the operating status information. In an exemplary embodiment, the operating status information may indicate at least whether the handheld electronic device is roaming. The at least one processor may also function during operation to, among other things, initiate a device management session with the one of the plurality of handheld electronic devices, if the operating condition is met. The plurality of handheld electronic devices may comprise one of a mobile handset and a cellular phone, and the received operating status information is communicated as extensible markup language (XML). The device management protocol standard may be the device management protocol referred to as the Open Mobile Alliance (OMA) Device Management (DM) Version 1.2 or earlier protocol. The operating status information may be representative of roaming status of the one of the plurality of handheld electronic devices, and the operating condition may be that the one of the plurality of handheld electronic devices is not roaming.

In a representative embodiment of the present invention, the initiated device management session may download update information used to update one or more of firmware, software and/or configuration information to the one of the plurality of handheld electronic devices, and the communication network may comprises a public communication network. The at least one processor may further function, during operation, to at least accept a request to deploy a communication service to the one of the plurality of handheld electronic devices, and determine actions enabling deployment of the communication service to the one of the plurality of electronic devices. The at least one processor may also function, during operation, to at least exchange communication in accordance with a device management protocol standard with the one of the plurality of handheld electronic devices, via the communication network, to perform the actions determined to enable deployment of the communication service to the one of the plurality of handheld electronic devices.

Still other aspects of the present invention may be observed in a handheld electronic device comprising at least one non-volatile memory having stored therein one or both of firmware and software, and at least one processor operably coupled to the non-volatile memory. The at least one processor may, during operation, at least wirelessly exchange communication in accordance with a device management protocol standard with at least one remote server, via a communication network, to perform actions determined to enable deployment of a communication service to the handheld electronic device. The at least one processor may also, during operation, at least automatically collect real-time information on user consumption of the deployed communications service, and wirelessly transmit the collected real-time information on user consumption of the deployed communications service to the at least one remote server. The handheld electronic device may comprise one of a mobile handset and a cellular phone, and the device management protocol standard may be the device management protocol referred to as the Open Mobile Alliance (OMA) Device Management (DM) Version 1.2 or earlier protocol. The communication network may comprise a public communication network.

Although a system and method according to the present invention has been described in connection with the preferred embodiment, it is not intended to be limited to the specific form set forth herein, but on the contrary, it is intended to cover such alternative, modifications, and equivalents, as can be reasonably included within the scope of the invention as defined by this disclosure and appended diagrams.

Accordingly, the present invention may be realized in hardware, software, or a combination of hardware and software. The present invention may be realized in a centralized fashion in at least one computer system, or in a distributed fashion where different elements are spread across several interconnected computer systems. Any kind of computer system or other apparatus adapted for carrying out the methods described herein is suited. A typical combination of hardware and software may be a general-purpose computer system with a computer program that, when being loaded and executed, controls the computer system such that it carries out the methods described herein.

The present invention may also be embedded in a computer program product, which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

While the present invention has been described with reference to certain embodiments, it will be understood by those skilled in the art that various changes may be made and equivalents may be substituted without departing from the scope of the present invention. In addition, many modifications may be made to adapt a particular situation or material to the teachings of the present invention without departing from its scope. Therefore, it is intended that the present invention not be limited to the particular embodiment disclosed, but that the present invention will include all embodiments falling within the scope of the appended claims.

What is claimed is:

1. A handheld electronic device comprising:
   at least one non-volatile memory having stored therein one or both of firmware and software;
   at least one processor operably coupled to the non-volatile memory, wherein the at least one processor, during operation, at least:
   stores operating status information of the handheld electronic device as a sub-node of a standards-defined device management object in a device management tree in the non-volatile memory the operating status information indicating at least whether the handheld electronic device is roaming;
   wirelessly receives, from at least one remote server via a communication network, a request for the operating status information, the request communicated according to a device management protocol standard;
   wirelessly transmits the requested operating status information to the at least one remote server; and
   wherein only simple management operations that reduce air time are conducted when the handheld electronic device is roaming, and more data intensive management operations are conducted when the handheld electronic device is not roaming.

2. The handheld electronic device according to claim 1, wherein the operating status information is stored as a sub-node or part of a device management object defined in the Open Mobile Alliance (OMA) Device Management (DM) Version 1.2 or earlier protocol specification.

3. The handheld electronic device according to claim 1, wherein the non-volatile memory comprises flash type memory.

4. The handheld electronic device according to claim 1, wherein the communication network comprises a public communication network.

5. A system for managing service deployment in a plurality of handheld electronic devices, the system comprising:
   at least one server comprising:
   at least one interface enabling communication with the plurality of handheld electronic devices via a wireless communication network;
   at least one processor operably coupled to the at least one interface and at least one memory, the at least one processor functioning during operation to, among other things:
   receive operating status information for one of the plurality of handheld electronic devices via the wireless communication network in accordance with a device management protocol standard;
   determine whether the one of the plurality of handheld electronic devices is roaming, based upon the operating status information; and
   initiate a device management session with the one of the plurality of handheld electronic devices, and only conduct simple management operations that reduce air time when the one of the plurality of handheld electronic devices is roaming, and conduct more data intensive management operations when the one of the plurality of handheld electronic devices is not roaming.

6. The system according to claim 5, wherein the device management protocol standard is the device management protocol referred to as the Open Mobile Alliance (OMA) Device Management (DM) Version 1.2 or earlier protocol.

7. The system according to claim 5, wherein the operating status information is representative of roaming status of the one of the plurality of handheld electronic devices.

8. The system according to claim 7, wherein an operating condition is that the one of the plurality of handheld electronic devices is not roaming.

9. The system according to claim 5, wherein the initiated device management session downloads update information used to update one or more of firmware, software and/or configuration information to the one of the plurality of handheld electronic devices.

10. The system according to claim 5, wherein the communication network comprises a public communication network.

11. The system according to claim 5, wherein the at least one processor further functions, during operation, to at least:

accept a request to deploy a communication service to the one of the plurality of handheld electronic devices;
determine actions enabling deployment of the communication service to the one of the plurality of electronic devices; and
exchange communication in accordance with a device management protocol standard with the one of the plurality of handheld electronic devices, via the communication network, to perform the actions determined to enable deployment of the communication service to the one of the plurality of handheld electronic devices.

12. A handheld electronic device comprising:
at least one non-volatile memory having stored therein one or both of firmware and software;
at least one processor operably coupled to the non-volatile memory, wherein the at least one processor, during operation, at least:
wirelessly exchanges communication in accordance with a device management protocol standard with at least one remote server, via a communication network, to perform actions determined to enable deployment of a communication service to the handheld electronic device;
automatically collects real-time information on user consumption of the deployed communications service, the real-time information indicating whether the handheld electronic device is roaming;
wirelessly transmits the collected real-time information on user consumption of the deployed communications service to the at least one remote server;
conducts only simple management operations when the handheld electronic device is roaming; and
conducts data intensive management operations when the handheld electronic device is not roaming.

13. The handheld electronic device according to claim 12, wherein the handheld electronic device comprises one of a mobile handset and a cellular phone.

14. The handheld electronic device according to claim 12, wherein the device management protocol standard is the device management protocol referred to as the Open Mobile Alliance (OMA) Device Management (DM) Version 1.2 or earlier protocol.

15. The handheld electronic device according to claim 12, wherein the communication network comprises a public communication network.

16. The handheld electronic device according to claim 1, wherein the at least one processor, during operation, only uses a heavy-weight protocol for management operations only when the handheld electronic device is not roaming.

17. The handheld electronic device according to claim 1, wherein the at least one processor, during operation, only uses a light-weight protocol for management operations when the handheld electronic device is roaming.

18. The handheld electronic device according to claim 1, wherein the at least one processor, during operation, requests user approval before conducting any device management operations when the handheld electronic device is roaming.

19. The handheld electronic device according to claim 1, wherein the at least one processor, during operation, only sets parameter values when the handheld electronic device is roaming.

20. The handheld electronic device according to claim 1, wherein the at least one processor, during operation, only changes configuration when the handheld electronic device is roaming.

* * * * *